United States Patent [19]

Nedbal et al.

[11] Patent Number: 5,301,775
[45] Date of Patent: Apr. 12, 1994

[54] ADJUSTABLE HIGH TORQUE DAMPER DEVICE

[75] Inventors: Ralph G. Nedbal, Saint Charles; Steven L. Bivens, Kankakee, both of Ill.

[73] Assignee: Illinois Tool Works Inc., Glenview, Ill.

[21] Appl. No.: 83,718

[22] Filed: Jun. 29, 1993

[51] Int. Cl.⁵ ............................................. F16D 57/02
[52] U.S. Cl. ................................... 188/290; 188/322.5
[58] Field of Search .............. 188/290, 291, 292, 293, 188/294, 295, 296, 322.5, 268, 271; 16/82, 51; 192/4 B; 74/574

[56] References Cited

U.S. PATENT DOCUMENTS

| | | | |
|---|---|---|---|
| 4,426,752 | 1/1984 | Nakayama | 16/82 |
| 4,527,675 | 7/1985 | Omata et al. | 188/290 |
| 4,618,039 | 10/1986 | Omata | 192/4 |
| 4,638,528 | 1/1987 | Omata | 16/82 |
| 4,694,530 | 9/1987 | Foggini | 16/82 |
| 4,899,854 | 2/1990 | Cartoni | 188/290 |
| 4,938,322 | 7/1990 | Sugasawara et al. | 188/290 |

*Primary Examiner*—Douglas C. Butler
*Attorney, Agent, or Firm*—T. W. Buckman; J. P. O'Brien

[57] ABSTRACT

An adjustable high torque damper device is provided which can be easily and rapidly adjusted so as to produce variable amounts of torque over a predetermined range. The damper device includes a plurality of co-mating concentric rings formed on a stator housing and a rotor. As a cap is screwed into or out of the housing, the distances between the rotor concentric rings and the stator concentric rings are selectively and gradually increased and decreased to thereby decrease or increase the amount of torque.

20 Claims, 2 Drawing Sheets

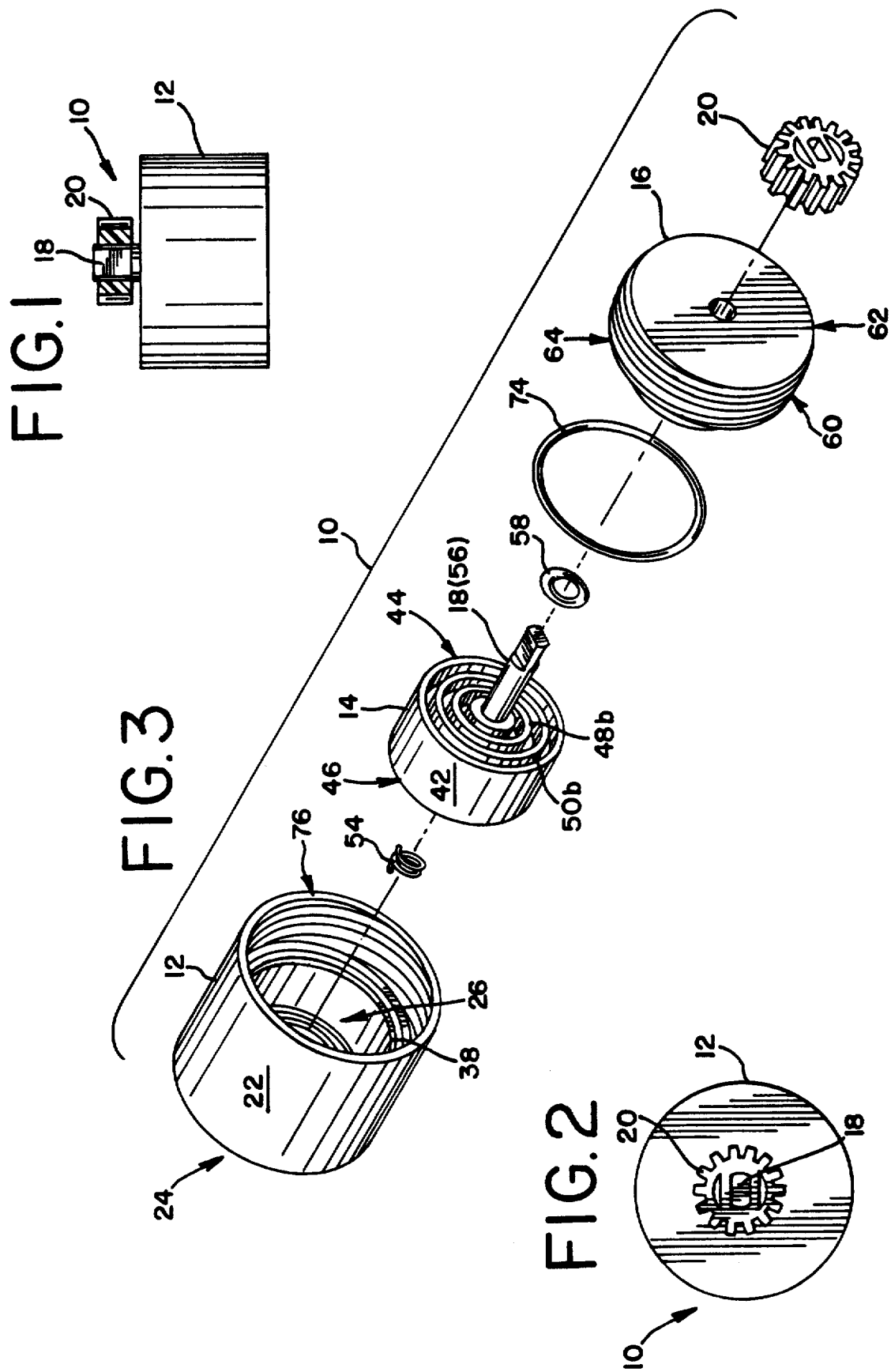

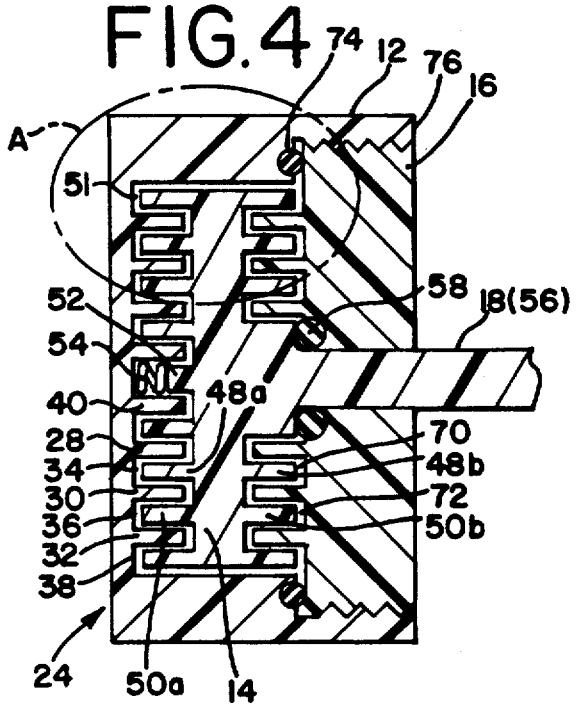
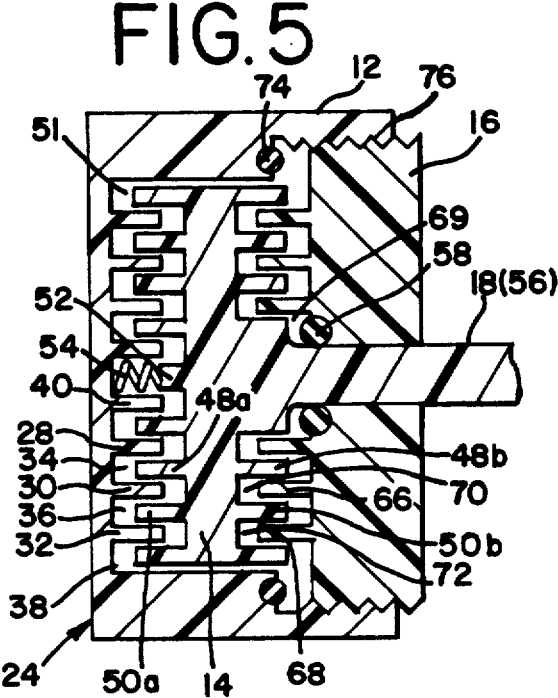
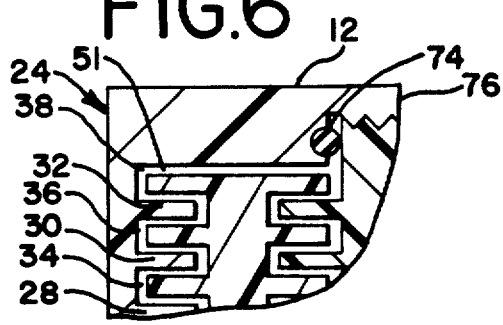
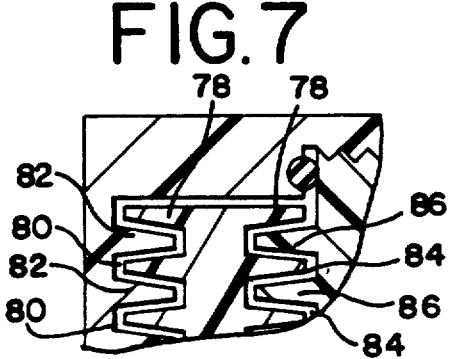
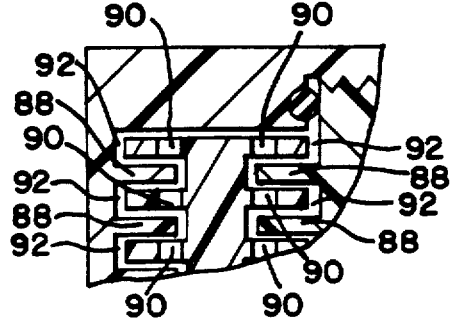

ADJUSTABLE HIGH TORQUE DAMPER DEVICE

BACKGROUND OF THE INVENTION

1. Field of the Invention

This invention relates generally to rotary oil-type dampening devices and more particularly, it relates to an improved high torque damper device which can be easily adjusted so as to produce variable amounts of torque over a predetermined range.

2. Description of the prior art

A prior art search directed to the subject matter of this application in the U.S. Patent and Trademark Office revealed the following U.S. Pat. Nos.:

| | |
|---|---|
| 4,426,752 | 4,638,528 |
| 4,527,675 | 4,694,530 |
| 4,618,039 | 4,938,322 |

It is generally known in the art that an oil-type damper device can be incorporated as a mechanism for controlling the opening and closing of doors and drawers in order to absorb the shock imparted by an external force. Such oil-type damper devices find convenient application, for example, in automotive vehicles where the opening of a door of a glove compartment mounted in a dashboard is prevented from occurring with a snap action, thus avoiding the contents thereof from being scattered. Since the glove compartment may be filled with objects of relatively heavier weight as compared to those in an ashtray, such a damper device is normally required to be designed to have a high-torque strength against the external forces. As a result, this causes the disadvantage that these damper devices become very large in their overall size and are quite bulky.

Further, the doors of the glove compartments in the automotive vehicles are known to come in various sizes and weights. Accordingly, there is encountered another drawback if a damper device having a different dampening effect is required. This is because a completely new damper device would be needed so as to accommodate the various weights of the doors. Heretofore, these prior art damper devices were only capable of altering their dampening effect by varying the viscosity of the oil used. Therefore, this made the conventional damper devices generally unusable for different types of doors and involved the use of expensive manufacturing of alternate components and time-consuming labor costs.

In U.S. Pat. No. 4,527,675 to N. Omata et al. issued on Jul. 9, 1985, there is disclosed an oil type damper which includes a cylindrical housing formed of a base 1 and a cap 2, a rotator 10 having a hollow shaft 12 and a braking disk 11, and a flexible membrane 16 fitted around the shaft. A toothed wheel 13 has a pin 13a which is adapted to be forced into the hollow part of the shaft 12. The oil is injected through the hollow part of the hollow shaft after the rotator and the flexible membrane have been set inside of the housing but before the toothed wheel is secured to the hollow shaft. The flexible membrane is used to absorb thermal expansion of the oil and prevents leakage thereof along the hollow shaft and out of the housing.

In U.S. Pat. No. 4,638,528 to N. Omata issued on Jan. 27, 1987, there is disclosed an oil type damper which is somewhat similar to the '675 patent. In particular, the '528 patent teaches an oil damper which is comprised of a housing formed of a basic member 1 and a cap 2, a rotating member 10 having a disc 11 and two shafts 12, 13, and a braking disc 15 adapted to rotate jointly and accommodated within the housing. The first shaft 12 has an end protruding through the boss 7 in the cap 2 for receiving a toothed wheel 14. A flexible member 17 is secured to the second shaft 13, with the flexible member being disposed between the disc 11 and the disc 15. Viscous oil is applied to the braking disc. When the oil expands in volume due to rising temperatures, the flexible membrane 17 is deformed under pressure so as to absorb the voluminal expansion of the oil and thus prevents leakage of the oil from the housing.

U.S. Pat. No. 4,694,530 to P. Foggini issued on Sep. 22, 1987, discloses a device for controlling the opening and closing of moving objects, such as doors and drawers in motor vehicles. The device 15 is comprised of a rotor 18 and a stator 17. The rotor 18 has a central pin 183, a plurality of concentrically arranged cylinders 180-182, a sprocket wheel 14 adapted for meshed engagement with a rack 13 fixed to the sidewall of a drawer compartment 12. The stator 17 is adapted to be attached to a drawer 10 and is rotatably mounted on the central pin 183. The stator is further comprised of a plurality of concentrically arranged cylinders 170-172 interposed between those of the rotor. The relative movement between the rotor 18 and the stator 17 is controlled by an arrangement of co-operating grooves 20,21, a cam 22, and a ball 23, and a high density fluid LS is interposed between the cylinders of the rotor and stator for slowing down the relative rotary motion therebetween.

The remaining patents uncovered from the search but not specifically discussed are merely cited to generally show the state of the art and are directed to various types of dampening devices for braking and absorbing abrupt motions encountered during the opening and closing of movable objects such as doors, drawers, and the like.

It will be noted that none of the prior art uncovered in the search disclosed a high torque damper device like that of the present invention which can be easily adjusted so as to produce variable amounts of torque over a predetermined range. This is accomplished in the present invention by simply rotating the cap so as to increase or decrease the distance between a plurality of co-mating concentric rings formed on a rotor and a stator housing in order to vary the frictional load.

SUMMARY OF THE INVENTION

Accordingly, it is a general object of the present invention to provide an improved high torque damper device for producing variable amounts of torque which is relatively simple and economical to manufacture and assemble.

It is another object of the present invention to provide an improved high torque damper device which can be easily and rapidly adjusted so as to produce variable amounts of torque over a predetermined range.

It is another object of the present invention to provide an improved high torque damper device of a construction which generates higher amounts of torque than those traditionally available of the same overall size.

It is still another object of the present invention to provide an improved high torque damper device which includes torque adjustment means formed of a plurality of co-mating concentric rings disposed on a rotor and a stator housing.

In accordance with these aims and objectives, the present invention is concerned with the provision of an adjustable high torque damper device which includes a stator housing, a rotor, a cap, and means for adjusting the amount of resistance to rotational movement of the rotor relative to the stator housing so as to supply a variable amount of torque. The stator housing is formed of a cylindrically-shaped wall member which has a closed end and an interior cavity. The rotor is formed of a cylindrically-shaped wall member which has a top end and a bottom end. The rotor is disposed rotatably within the interior cavity of the stator housing. The rotor includes a shaft extending perpendicularly from the center of its top end. The cap is formed of a cylindrically-shaped wall member which has an upper surface and a lower surface for closing the interior cavity of the stator housing. The cap has a central opening through which the shaft of the rotor extends therethrough.

The adjustment means include the stator housing having a plurality of first concentric rings disposed inside the interior cavity thereof which define first grooves therebetween, and the rotor having a plurality of second concentric rings disposed on its bottom end which mate with corresponding ones of the first grooves between the first concentric rings. A high viscosity dampening fluid is used to fill the first grooves between the first concentric rings and the spaces between the second concentric rings. The adjustment means further include means for controlling the relative axial motion of the rotor concentric ring and the stator concentric ring so as to selectively and gradually increase or decrease the distances therebetween and thereby decreasing or increasing the amount of torque.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a side elevational view of an adjustable high torque damper device, constructed in accordance with the principles of the present invention;

FIG. 2 is a top plan view of the damper device of FIG. 1;

FIG. 3 is an exploded perspective view of the damper device of FIG. 1;

FIG. 4 is a cross-sectional view, taken along the lines 4—4 of FIG. 2, illustrating the cap being fully threaded into the housing so as to produce the maximum torque;

FIG. 5 is a cross-sectional view, similar to FIG. 4, but with the cap partially withdrawn from the housing so as to produce a decreased amount of torque;

FIG. 6 is an enlarged view of the encircled area A of FIG. 4;

FIG. 7 is a cross-sectional view similar to FIG. 6, illustrating an alternate embodiment of the concentric rings formed on the rotor and stator housing; and FIG. 8 shows another alternate embodiment of the concentric rings formed on the stator housing, rotor and cap.

DESCRIPTION OF THE PREFERRED EMBODIMENTS

Referring now in detail to the various views of the drawings, there is shown in FIGS. 1-6 an improved high torque damper device 10 of the present invention which can be easily and rapidly adjusted so as to produce variable amounts of torque over a predetermined range. The damper device 10 is comprised substantially of a stator housing 12, a rotor 14, and a threaded end cap 16.

The damper device is preferably used for dampening the opening of a glove compartment door in an automotive vehicle. The rotor has a shaft 18 on its one end for receiving a toothed wheel gear 20. The toothed gear is adapted to be in meshed engagement with a rack (not shown) operatively connected to the glove compartment door. The housing is filled with a dampening oil for dampening the rotation of the shaft. As a result, upon movement of the glove compartment door, the rotor rotates about its axis with a braking force being applied as the toothed gear 20 rolls smoothly on the rack.

The stator housing 12 is formed of a cylindrically-shaped wall member 22 having a closed end 24 and an interior cavity 26. Inside the cavity 26, there are provided a plurality of concentric rings 28, 30, 32 with annular grooves 34 and 36 formed therebetween. On the inside surface of the wall member 22, there is provided an annular flange 38 located at approximately mid-way of the entire axial length of the wall member 22. A central sleeve 40 projects upwardly from the center of the interior cavity 26 of the stator housing 12 in its axial direction thereof.

The rotor 14 is also formed of a cylindrically-shaped wall member 42 having a top end 44 and a bottom end 46. A plurality of concentric rings 48a, 50a are formed in the bottom end 46 of the rotor which are interposed in the corresponding ones of the grooves 34, 36 between the concentric rings 28-32 of the stator housing. The grooves 34, 36 between the concentric rings 28-32 and the spaces between the concentric rings 48a, 50a are filled with a high viscosity dampening fluid 51, such as silicone grease having a high viscous resistance so as to control the relative rotary motion between the stator housing 12 and the rotor 14. The wall member 42 of the rotor is dimensioned so as to come into fast engagement with the annular flange 38 of the stator housing. A stem portion 52 projects downwardly from the center of the bottom end 46 of the rotor in its axial direction. A compression spring 54 is sandwiched between the outer surface of the stem portion 52 and the central sleeve 40 of the stator housing 12.

The top end 44 of the rotor is also provided with a plurality of concentric rings 48b, 50b which are generally aligned with the corresponding rings 48a, 50a on the bottom end 46 of the rotor. Similarly, the spaces between the concentric rings 48b, 50b are filled with the high viscosity dampening fluid 51. Further, a shaft 56 extends perpendicularly from the center of the top end of the rotor. An O-ring 58 fits around the shaft so as to prevent seepage of the dampening fluid from the center of the shaft along its axial direction.

The end cap 16 is likewise formed of a cylindrically-shaped wall member 60 having an upper surface 62 and a lower surface 64. In the center of the lower surface 64, there are provided a plurality of concentric rings 66, 68 which surround a central opening 69 through which the shaft 56 of the rotor extends. The concentric rings 66, 68 are interposed in the grooves 70, 72 between the concentric rings 48b, 50b on the top end 44 of the rotor. Similarly, the grooves 70, 72 between the concentric rings 48b, 50b and the spaces between the concentric rings 66, 68 are filled with the high viscosity dampening fluid 51. An O-ring 74 fits around the ring 68 so as to be disposed between the end cap 16 and the stator housing 12. The O-ring 74 forms a seal between the cap and the stator housing so as to eliminate the silicone grease from flowing along the outer surface of the cap and leaking out of the housing.

It will be noted that the outside diameter of the wall member 42 of the rotor is slightly smaller than the inside diameter of the wall member 22 of the stator housing. Also, the outer circumference of the wall member 60 adjacent the upper surface 62 of the end cap 16 is threaded so as to mate with the internal threads formed on the inside surface of the housing 12 adjacent its opened end 76.

The assembly of the damper device 10 is accomplished by initially taking the stator housing 12 and filling the grooves 34, 36 thereof with a predetermined amount of the silicone grease. One end of the compression spring 54 is then inserted into the central sleeve 40 in the housing. Next, with the shaft 56 being held, the rotor 14 is pushed into the housing 12 and turned so that the concentric rings 48a, 50a thereof are interposed in corresponding ones of the grooves 34, 36 of the housing. Another predetermined amount of silicone grease is applied to the grooves 70, 72 on the top end 44 of the rotor. The O-ring 58 is placed around the shaft 56 of the rotor, and the O-ring 74 is placed around the concentric ring 68 of the end cap 16. Then, the cap is placed over the shaft 56 so that it extends through the central opening 69 thereof outwardly from the inside of the cap. Finally, the cap 16 is threaded into the housing 12.

In operation, the amount of torque over a selected range in the present damper device 10 can be easily and rapidly adjusted or varied by changing the surface area which contacts the dampening fluid. In other words, in order to increase the amount of torque to be supplied the cap 16 is screwed further into the stator housing 12 an incremental amount. As the cap is being screwed into the housing, the rotor 14 will be pushed inwardly or downwardly into the interior cavity 26 so as to increase the amount of dampening surface area between the concentric rings of the rotor and the concentric rings of the housing (the distance therebetween being decreased). As a consequence, the overall torque of the damper device is increased. As can best be seen from FIG. 4, the cap 16 is fully threaded into the stator housing 12 so as to produce the maximum amount of torque.

On the other hand, in order to decrease the amount of torque to be supplied the end cap 16 is screwed out of the housing an incremental amount. As the cap is being partially screwed out from the housing, the rotor will be pushed outwardly or upwardly by the compression spring 54 to the position, as shown in FIG. 5, so as to decrease the amount of dampening surface area between the concentric rings of the rotor and the concentric rings of the housing (the distance therebetween being increased). As a result, the overall torque of the damper device is decreased.

The present damper device represents a significant improvement over the prior art oil-type dampers in which the amount of torque could only be adjusted by changing the viscosity of the dampening fluid. The damper device 10 of the present invention can be easily and rapidly adjusted by simply rotating the end cap 16 in a clockwise direction or counter-clockwise direction so as to selectively and gradually increase or decrease the surface area between the rotor rings and housing grooves thereby varying the frictional load. The damper device generates a higher amount of torque than the traditional dampers of the same overall size.

In FIG. 7 of the drawings, there is shown an alternate embodiment in which the concentric rings 78 formed on the top and bottom ends of the rotor are tapered. Further, the grooves 80 between the concentric rings 82 in the housing and the grooves 84 between the concentric rings 86 in the cap are also tapered so as to mate with the tapered rings 78 of the respective top and bottom ends of the rotor. In this manner, the desired amount of torque can be more precisely controlled since the amount of surface area between the rotor and housing can be changed on a more gradual basis.

In FIG. 8 of the drawings, there is shown another alternate embodiment in which each of the concentric rings 88 in the housing, rotor and cap is provided with at least one opening or slot 90 so as to facilitate circulation of the silicone grease between the adjacent grooves 92. This results in a more uniform distribution of the silicone grease throughout the damper device so as to provide a smooth continuous movement of the rotor relative to the housing.

From the foregoing detailed description, it can thus be seen that the present invention provides an improved high torque damper device which can be easily and rapidly adjusted so as to produce variable amounts of torque over a predetermined range. The torque adjustment means includes a plurality of co-mating concentric rings formed on the housing and rotor. As the cap is threaded into and out of the housing, the distances between the rotor concentric rings and the stator concentric rings are selectively and gradually increased or decreased so as to thereby decrease or increase the amount of torque.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. An adjustable high torque damper device comprising:
   a stator housing formed of a cylindrically-shaped wall member having a closed end and an interior cavity;
   a rotor formed of a cylindrically-shaped wall member having a top end and a bottom end, said rotor being disposed rotatably within the interior cavity of said stator housing, said rotor including a shaft extending perpendicularly from the center of its top end;
   a cap formed of a cylindrically-shaped wall member having an upper end and a lower end for closing the interior cavity of said stator housing, said cap having a central opening through which said shaft of said rotor extends therethrough;
   means for adjusting the amount of resistance to rotational movement of said rotor shaft relative to said stator housing so as to supply a variable amount of torque;

said adjustment means including said stator housing having a plurality of first concentric rings disposed inside the interior cavity thereof which define first grooves therebetween, and said rotor having a plurality of second concentric rings disposed on its bottom end which mate with corresponding ones of said first grooves between said first concentric rings;

a high viscosity dampening fluid filling said first grooves between said first concentric rings and the spaces between said second concentric rings; and said adjustment means further including means for controlling relative axial motion of said rotor concentric rings and said stator concentric rings so as to selectively and gradually increase or decrease the distances therebetween thereby decreasing or increasing the amount of torque.

2. An adjustable high torque damper device as claimed in claim 1, wherein said adjusting means further includes said rotor having a plurality of third concentric rings disposed on its top end which define second grooves therebetween and said cap having a plurality of fourth concentric rings disposed on its lower surface which mate with corresponding ones of said second grooves between said third concentric rings, said dampening fluid also filling said second grooves between said third concentric ring and the spaces between said fourth concentric rings.

3. An adjustable high torque damper device as claimed in claim 1, wherein said means for controlling the relative axial motion of said rotor concentric rings and said stator concentric rings include co-mating threads formed on said cap and said housing which permit said cap to be screwed into or out of said housing.

4. An adjustable high torque damper device as claimed in claim 3, further comprising a compression spring disposed between the interior cavity of said housing and said bottom end of said rotor so as to supply upward axial pressure on said rotor so as to push said rotor up and away from interior cavity as said cap is being screwed out of said housing.

5. An adjustable high torque damper device as claimed in claim 3, wherein when said cap is screwed into said housing said rotor is pushed downwardly into the interior cavity thereof to decrease the distance between said first and second concentric rings and thus increase the overall torque, and when said cap is screwed out of said housing said rotor is pushed upwardly out of the interior cavity thereof to increase the distance between said first and second concentric rings and thus decrease the overall torque.

6. An adjustable high torque damper device as claimed in claim 1, further comprising first sealing means disposed on said shaft for preventing seepage of the dampening fluid from the center of the shaft along its axial direction.

7. An adjustable high torque damper device as claimed in claim 6, wherein said first sealing means comprises a first O-ring.

8. An adjustable high torque damper device as claimed in claim 7, further comprising second sealing means disposed between said cap and said housing for eliminating the dampening fluid from flowing along the outer surface of said cap and leaking out of said housing.

9. An adjustable high torque damper device as claimed in claim 8, wherein said second sealing means comprises a second O-ring.

10. An adjustable high torque damper device as claimed in claim 2, wherein said first through fourth concentric rings and said first and second grooves are tapered so as to provide more precise control on the desired amount of torque.

11. An adjustable high torque damper device as claimed in claim 2, wherein each of the first through fourth concentric rings include at least one opening therein so as to facilitate circulation of the dampening fluid between the adjacent spaces.

12. An adjustable high torque damper device comprising:

stator housing means formed of a cylindrically-shaped wall member having a closed end and an interior cavity;

rotor means formed of a cylindrically-shaped wall member having a top end and a bottom end, said rotor means being disposed rotatably within the interior cavity of said stator housing means, said rotor means including a shaft extending perpendicularly from the center of its top end;

a cap formed of a cylindrically-shaped wall member having an upper end and a lower end for closing the interior cavity of said stator housing means, said cap having a central opening through which said shaft of said rotor means extends therethrough;

means for adjusting the amount of resistance to rotational movement of said shaft of said rotor means relative to said stator housing means so as to supply a variable amount of torque;

said adjustment means including said stator housing means having a plurality of first concentric rings disposed inside the interior cavity thereof which define first grooves therebetween, and said rotor means having a plurality of second concentric rings disposed on its bottom end which mate with corresponding ones of said first grooves between said first concentric rings;

a high viscosity dampening fluid filling said first grooves between said first concentric rings and the spaces between said second concentric rings; and said adjustment means further including means for controlling relative axial motion of said concentric rings of said rotor means and said concentric rings of said stator housing means so as to selectively and gradually increase or decrease the distances therebetween thereby decreasing or increasing the amount of torque.

13. An adjustable high torque damper device as claimed in claim 12, wherein said adjusting means further includes said rotor means having a plurality of third concentric rings disposed on its top end which define second grooves therebetween and said cap having a plurality of fourth concentric rings disposed on its lower surface which mate with corresponding ones of said second grooves between said third concentric rings, said dampening fluid also filling said second grooves between said third concentric ring and the spaces between said fourth concentric rings.

14. An adjustable high torque damper device as claimed in claim 12, wherein said means for controlling the relative axial motion of said rotor concentric rings and said stator concentric rings include co-mating threads formed on said cap and said housing means which permit said cap to be screwed into or out of said housing means.

15. An adjustable high torque damper device as claimed in claim 14, further comprising a compression spring disposed between the interior cavity of said housing means and said bottom end of said rotor means so as to supply upward axial pressure on said rotor means so as to push said rotor means up and away from interior cavity as said cap is being screwed out of said housing means.

16. An adjustable high torque damper device as claimed in claim 14, wherein when said cap is screwed into said housing means said rotor means is pushed downwardly into the interior cavity thereof to decrease the distance between said first and second concentric rings and thus increase the overall torque, and when said cap is screwed out of said housing means said rotor means is pushed upwardly out of the interior cavity thereof to increase the distance between said first and second concentric rings and thus decrease the overall torque.

17. An adjustable high torque damper device as claimed in claim 12, further comprising first sealing means disposed on said shaft for preventing seepage of the dampening fluid from the center of the shaft along its axial direction.

18. An adjustable high torque damper device as claimed in claim 13, wherein said first through fourth concentric rings and said first and second grooves are tapered so as to provide more precise control on the desired amount of torque.

19. An adjustable high torque damper device as claimed in claim 13, wherein each of the first through fourth concentric rings include at least one opening therein so as to facilitate circulation of the dampening fluid between the adjacent spaces.

20. An adjustable high torque damper device comprising:
- a stator housing formed of a cylindrically-shaped wall member having a closed end and an interior cavity;
- a rotor formed of a cylindrically-shaped wall member having a top end and a bottom end, said rotor being disposed rotatably within the interior cavity of said stator housing, said rotor including a shaft extending perpendicularly from the center of its top end;
- a cap formed of a cylindrically-shaped wall member having an upper end and a lower end for closing the interior cavity of said stator housing, said cap having a central opening through which said shaft of said rotor extends therethrough;
- said stator housing having a plurality of first concentric rings disposed inside the interior cavity thereof which form first grooves therebetween;
- said rotor having a plurality of second concentric rings disposed on its bottom end which mate with corresponding ones of said first grooves between said first concentric rings;
- a high viscosity dampening fluid filling said first grooves between said first concentric rings and the spaces between said second concentric rings; and
- torque adjustment means for controlling relative axial motion of said rotor concentric rings and said stator concentric rings so as to selectively and gradually increase or decrease the distances therebetween thereby decreasing or increasing the amount of torque.

* * * * *